(12) United States Patent
Shen

(10) Patent No.: US 9,946,712 B2
(45) Date of Patent: Apr. 17, 2018

(54) TECHNIQUES FOR USER IDENTIFICATION OF AND TRANSLATION OF MEDIA

(71) Applicant: Google Inc., Mountain View, CA (US)

(72) Inventor: Hong Shen, Beijing (CN)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 14/897,510

(22) PCT Filed: Jun. 13, 2013

(86) PCT No.: PCT/CN2013/077161
§ 371 (c)(1),
(2) Date: Dec. 10, 2015

(87) PCT Pub. No.: WO2014/198035
PCT Pub. Date: Dec. 18, 2014

(65) Prior Publication Data
US 2016/0140113 A1  May 19, 2016

(51) Int. Cl.
*G06F 17/28* (2006.01)
*H04N 21/488* (2011.01)

(52) U.S. Cl.
CPC ....... *G06F 17/289* (2013.01); *H04N 21/4884* (2013.01)

(58) Field of Classification Search
None
See application file for complete search history.

(56) References Cited

U.S. PATENT DOCUMENTS 5,465,240 A * 11/1995 Mankovitz ............. G09B 5/065
  360/48
5,543,851 A *  8/1996 Chang ................ H04N 5/44513
  348/468

(Continued)

FOREIGN PATENT DOCUMENTS

| CN | 101309449 A | 11/2008 |
| CN | 102446169 A |  5/2012 |
| CN | 103136969 A |  6/2013 |

OTHER PUBLICATIONS

PCT International Search Report and Written Opinion dated Mar. 20, 2014 for PCT International Application No. PCT/CN2013/077161 (10 pages).

*Primary Examiner* — Pierre-Louis Desir
*Assistant Examiner* — Jonathan Kim
(74) *Attorney, Agent, or Firm* — RMCK Law Group, PLC

(57) ABSTRACT

A computer-implemented technique includes receiving, at a computing device including one or more processors, a user input (i) identifying a portion of a media stream being output from the computing device and (ii) indicating a request to translate the portion of the media stream from a source language to a target language. The technique includes transmitting, from the computing device, the portion of the media stream to a translation server via a network in response to receiving the user input. The technique includes receiving, at the computing device, a translated portion of the media stream from the translation server via the network, the translated portion of the media stream having been translated from the source language to the target language by the translation server. The technique also includes outputting, at the computing device, the translated portion of the media stream.

20 Claims, 2 Drawing Sheets

(56) References Cited

U.S. PATENT DOCUMENTS

| | | | | |
|---|---|---|---|---|
| 5,606,498 A | * | 2/1997 | Maruta | G06F 15/0283 704/2 |
| 5,810,599 A | * | 9/1998 | Bishop | G09B 5/065 434/118 |
| 6,482,011 B1 | * | 11/2002 | Lee | G09B 5/06 434/157 |
| 7,117,231 B2 | * | 10/2006 | Fischer | H04N 21/235 |
| 8,379,072 B2 | | 2/2013 | Hybschmann et al. | |
| 8,464,066 B1 | * | 6/2013 | Price | H04L 63/10 709/217 |
| 8,645,134 B1 | * | 2/2014 | Harrenstien | G10L 15/26 704/235 |
| 8,707,381 B2 | * | 4/2014 | Polumbus | G06F 17/30746 704/251 |
| 8,740,620 B2 | | 6/2014 | Dohring et al. | |
| 2001/0025241 A1 | * | 9/2001 | Lange | G10L 15/005 704/235 |
| 2002/0161578 A1 | * | 10/2002 | Saindon | G06F 17/289 704/235 |
| 2002/0161579 A1 | * | 10/2002 | Saindon | G06F 17/28 704/235 |
| 2003/0065503 A1 | * | 4/2003 | Agnihotri | G06F 17/2705 704/7 |
| 2005/0216919 A1 | * | 9/2005 | Hull | G06F 17/30017 719/322 |
| 2005/0223322 A1 | * | 10/2005 | Graham | G06F 3/1206 715/255 |
| 2005/0229092 A1 | * | 10/2005 | Hull | G06F 17/212 715/200 |
| 2005/0229107 A1 | * | 10/2005 | Hull | G06F 17/212 715/764 |
| 2006/0064716 A1 | * | 3/2006 | Sull | G06F 17/30793 725/37 |
| 2006/0136223 A1 | * | 6/2006 | Brun | G06F 17/289 704/277 |
| 2006/0200253 A1 | * | 9/2006 | Hoffberg | G05B 15/02 700/19 |
| 2007/0033528 A1 | * | 2/2007 | Merril | G02B 26/0816 715/732 |
| 2007/0244688 A1 | * | 10/2007 | Bangalore | G06F 17/289 704/3 |
| 2008/0098433 A1 | * | 4/2008 | Hardacker | H04N 7/163 725/52 |
| 2009/0297118 A1 | * | 12/2009 | Fink | G06F 17/3082 386/278 |
| 2010/0324887 A1 | * | 12/2010 | Dong | G06F 17/289 704/8 |
| 2011/0060591 A1 | * | 3/2011 | Chanvez | H04M 3/2281 704/270 |
| 2012/0173235 A1 | * | 7/2012 | Mountain | G10L 15/26 704/235 |
| 2013/0058471 A1 | * | 3/2013 | Garcia | H04M 3/42221 379/202.01 |
| 2013/0080384 A1 | * | 3/2013 | Briggs | G06F 17/30026 707/610 |
| 2013/0091429 A1 | * | 4/2013 | Weng | G06F 3/048 715/716 |
| 2013/0144597 A1 | * | 6/2013 | Waibel | G06F 17/28 704/2 |
| 2013/0196292 A1 | * | 8/2013 | Brennen | G09B 19/06 434/157 |
| 2013/0238311 A1 | * | 9/2013 | Lou | G06F 17/289 704/3 |
| 2013/0251338 A1 | * | 9/2013 | Abecassis | H04N 5/445 386/241 |
| 2013/0295534 A1 | * | 11/2013 | Meiri | G09B 19/06 434/157 |
| 2014/0003792 A1 | * | 1/2014 | Soroushian | H04N 9/8238 386/244 |
| 2014/0053223 A1 | * | 2/2014 | Vorobyov | G10L 13/00 725/110 |
| 2014/0272820 A1 | * | 9/2014 | Wride | G09B 19/06 434/157 |
| 2015/0066505 A1 | * | 3/2015 | Baker | G06F 17/30746 704/235 |
| 2015/0143413 A1 | * | 5/2015 | Hall | G06Q 30/0271 725/34 |
| 2016/0066055 A1 | * | 3/2016 | Nir | G10L 15/05 725/35 |
| 2016/0133154 A1 | * | 5/2016 | Cortes | G09B 5/00 434/157 |
| 2016/0314116 A1 | * | 10/2016 | Kamatani | G06F 17/289 |

* cited by examiner

TECHNIQUES FOR USER IDENTIFICATION OF AND TRANSLATION OF MEDIA

CROSS-REFERENCE TO RELATED APPLICATIONS

This application is a 371 U.S. National Stage of International Application No. PCT/CN2013/077161, filed Jun. 13, 2013. The disclosure of the above application is incorporated herein by reference in its entirety.

FIELD

The present disclosure relates to language learning and, more particularly, to techniques for user identification of and translation of media.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A user may access a website from a computing device via a network such as the Internet. The website may display a web page to the user via a web browser executing on the computing device. The web page may include text, images, audio and/or video data, or a combination thereof, to be output to the user via one or more components associated with the computing device (a display, one or more speakers, etc.).

SUMMARY

A computer-implemented technique is presented. The technique can include outputting, at a computing device including one or more processors, a media stream that includes at least one of audio data and video data. The technique can include during the outputting of the media stream: (i) receiving, at the computing device, a first user input (a) identifying a portion of the media stream and (b) indicating a request to translate the portion of the media stream from a source language to a target language, (ii) determining, at the computing device, a text corresponding to the at least one of audio data and video data from the portion of the media stream, and (iii) transmitting, from the computing device, the text to a translation server via a network. The technique can include receiving, at the computing device, a translated text from the translation server via the network, the translated text having been translated from the source language to the target language by the translation server. The technique can also include outputting, at the computing device, the translated text after outputting of the media stream has completed.

Another computer-implemented technique is also presented. The technique can include receiving, at a computing device including one or more processors, a user input (i) identifying a portion of a media stream being output from the computing device and (ii) indicating a request to translate the portion of the media stream from a source language to a target language. The technique can include transmitting, from the computing device, the portion of the media stream to a translation server via a network in response to receiving the user input. The technique can include receiving, at the computing device, a translated portion of the media stream from the translation server via the network, the translated portion of the media stream having been translated from the source language to the target language by the translation server. The technique can also include outputting, at the computing device, the translated portion of the media stream.

In some embodiments, the media stream includes at least one of audio data and video data.

In other embodiments, the technique further includes determining, at the computing device, a text corresponding to the at least one of audio data and video data for the portion of the media stream.

In some embodiments, determining the text includes at least one of (i) optical character recognition of subtitles in the video data for the portion of the media stream and (ii) voice recognition of the audio data for the portion of the media stream.

In other embodiments, transmitting the portion of the media stream to the translation server via the network includes transmitting, from the computing device, the text to the translation server via the network during outputting of the media stream.

In some embodiments, receiving the translated portion of the media stream includes receiving a translated text, the translated text having been translated from the source language to the target language by the translation server.

In other embodiments, outputting the translated portion of the media stream includes outputting, at the computing device, the translated text.

In some embodiments, outputting the translated text includes outputting, at the computing device, the translated text after the outputting of the media stream has completed.

In other embodiments, the portion of the media stream is a predetermined period prior to when the user input was received.

In some embodiments, the user input includes one or more keystrokes of a keyboard.

A computing device is also presented. The computing device can include a user interface and a communication device. The user interface can be configured to receive a user input (i) identifying a portion of a media stream being output from the computing device and (ii) indicating a request to translate the portion of the media stream from a source language to a target language. The communication device can be configured to: transmit the portion of the media stream to a translation server via a network in response to receiving the user input, and receive a translated portion of the media stream from the translation server via the network, the translated portion of the media stream having been translated from the source language to the target language by the translation server. The user interface can also be configured to output the translated portion of the media stream.

In some embodiments, the media stream includes at least one of audio data and video data.

In other embodiments, the computing device further includes one or more processors configured to determine a text corresponding to the at least one of audio data and video data for the portion of the media stream.

In some embodiments, the one or more processors are configured to determine the text by at least one of (i) optical character recognition of subtitles in the video data for the portion of the media stream and (ii) voice recognition of the audio data for the portion of the media stream.

In other embodiments, the communication device is configured to transmit the portion of the media stream to the translation server via the network by transmitting the text to the translation server via the network during outputting of the media stream.

In some embodiments, the communication device is configured to receive the translated portion of the media stream by receiving a translated text, the translated text having been translated from the source language to the target language by the translation server.

In other embodiments, the user interface is configured to output the translated portion of the media stream by outputting the translated text.

In some embodiments, the user interface is configured to output the translated text by outputting the translated text after the outputting of the media stream has completed.

In other embodiments, the portion of the media stream is a predetermined period prior to when the user input was received.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
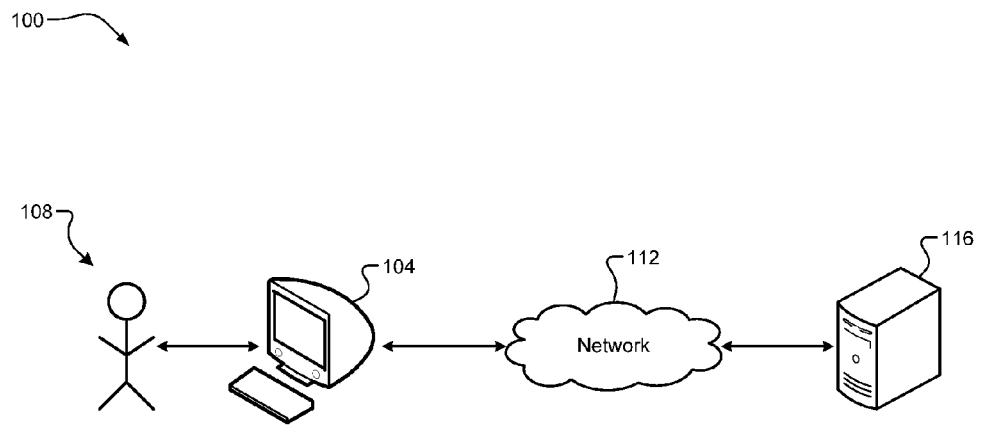
FIG. 1 is a functional block diagram of a computing network including an example computing device according to some implementations of the present disclosure.

As previously mentioned, a user may access a website that displays a web page including text, images, audio and/or video data, or a combination thereof. Given the worldwide reach of the Internet, the web page may have been created in a language that the user cannot understand. For example, the user may be unable to read text or subtitles of a video stream or the user may be unable to understand an audio stream. The user, therefore, may request to translate a portion of the web page (text, video subtitles, audio, etc.) from its source language to a target language that the user can understand.

Accordingly, techniques are presented for user identification of and translation of media. The techniques can generally provide for a more efficient method of user identification of and translation of media, which can improve a user's overall experience. The techniques also provide for identification of and translation of only a portion of media item that the user cannot understand, instead of translating the entire media item. The techniques can receive, at a computing device including one or more processors, a user input (i) identifying a portion of a media item and (ii) indicating a request to translate the portion of the media item from a source language to a target language. The term "media item" as used herein can refer to a digital item capable of being output at the computing device. The term "media item," therefore, can include text, video, audio, or a combination thereof. A media item including at least one of audio data and video data can also be referred to as a "media stream" because the media item may be streamed for a period of time. In response to the user input, the computing device can transmit the portion of the media item, e.g., a text, to a translation server via a network. The computing device can then receive a translated portion of the media item, e.g., a translated text, from the translation server via the network. In some cases, the media item may be a media stream, and the techniques can further include determining the text corresponding to a portion of the media stream, which can then be transmitted to the translation server via the network.

It should be appreciated that the techniques of the present disclosure can be executed a plurality of times during a particular period, e.g., during the media stream. In other words, the user may provide the user input a plurality of different times to identify different portions of the media item for translation. The techniques can then transmit these different portions of the media item to the translation server for translation. For example, the techniques can transmit the different portions sequentially or in one or more groups. Similarly, the techniques can then receive different translated portions of the media item from the translation server. For example, the techniques can receive the different translated portions sequentially or in the one or more groups. Each portion may also include a unique identifier for associating the portion of the media item (pre-translation) to its corresponding translated portion. The computing device can then output the different translated portions in any suitable manner (sequentially, in the one or more groups, etc.). For example only, the user may identify a plurality of portions of a media stream and, after the media stream has completed, the user can review the translated text for each of the plurality of portions.

Referring now to FIG. 1, a computing network 100 including an example computing device 104 according to some implementations of the present disclosure is illustrated. It should be appreciated that the term "computing device" as used herein can refer to any suitable computing device including one or more processors (a desktop computer, a laptop computer, a tablet computer, a mobile phone, etc.). The computing device 104 can receive input from and/or provide output to a user 108. The computing device 104 can communicate with other computing devices via a network 112. The network 112 can include a local area network (LAN), a wide area network (WAN), e.g., the Internet, or a combination thereof.

In particular, the computing device 104 can communicate with a server 116 via the network 112. It should be appreciated that the term "server" as used herein can refer to either a single server or two or more servers operating in a parallel or distributed architecture. The server 116 can be configured to perform translation of a text from a source language to a target language. The server 116, therefore, can be referred to hereinafter as translation server 116. The translation server 116 can perform translation of the text from the source language to the target language using any suitable language translation technique. For example only, the translation server 116 can translate the text from the source language to the target language using statistical machine translation (SMT).

According to the techniques of the present disclosure, the user 108 can provide a user input at the computing device 104. The user input can (i) identify a portion of a media item and (ii) indicate a request to translate the portion of the media item from a source language to a target language, which is described in further detail below. In response to the user input, the computing device 104 can transmit the portion of the media item, e.g., a text, to the translation server 116 via the network 112. The computing device 104 can then receive a translated portion of the media item, e.g., a translated text, from the translation server 116 via the network 112.

Figure 2:
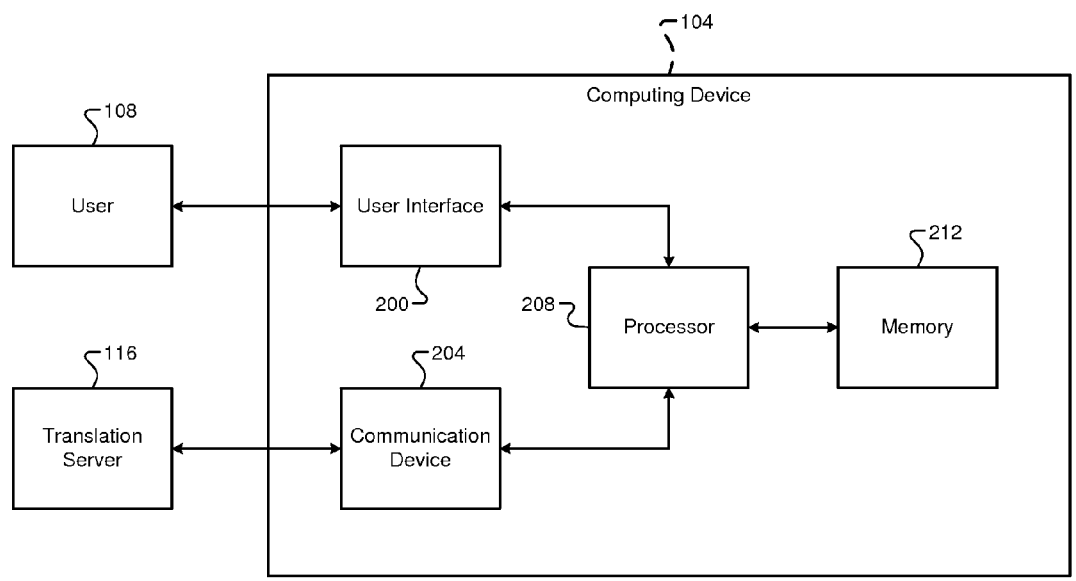
FIG. 2 is a functional block diagram of the example computing device of FIG. 1.

Referring now to FIG. 2, a functional block diagram of the example computing device 104 of FIG. 1 is illustrated. The computing device 104 can include a user interface 200, a communication device 204, a processor 208, and a memory 212

The user interface 200 can receive input to, e.g., from the user 108 and/or provide output from the computing device 104. It should be appreciated that the term "user interface" as used herein can refer to any suitable components for receiving input and/or providing output. For example, the user interface 200 can include a mouse, a keyboard, and/or a display.

The communication device 204 can control communication between the computing device 104 and other devices via the network 112. The communication device 204 can include any suitable components for communication via the network 112, e.g., a transceiver. In particular, the communication device 204 can control communication between the computing device 104 and the translation server 116 via the network 112. More specifically, the communication device 204 can transmit a text to the translation server 116 via the network 112 and can receive a translated text from the translation server 116 via the network 112.

The processor 208 can control operation of the computing device 104. It should be appreciated that the term "processor" as used herein can refer to either a single processor or two or more processors operating in a parallel or distributed architecture. For example, the processor 208 can perform functions including, but not limited to loading and executing an operating system of the computing device 104, controlling information input and/or output via the user interface 200, controlling communication over the network 112 via the communication device 204, and/or controlling read/write operations at the memory 212. The memory 212 can be any suitable storage medium (flash, hard disk, etc.) configured to store information at the computing device 104.

The processor 208 can also execute the techniques according to the present disclosure. The processor 208 can execute the media item to provide output (text, audio, video, etc.) to the user 108. During the outputting of the media item, the user 108 can provide a user input to the computing device 104 that (i) identifies a portion of the media item and (ii) indicates a request to translate the portion of the media item. The user input can include one or more mouse clicks, one or more keyboard keystrokes, or some combination thereof. Other suitable user input configurations can also be implemented. The specific user input can be predefined or specified by the user 108, and may be stored at the memory 212. The user input can also depend on the type of media item being output. For example, when the media item includes only text, e.g., a text-only web page, the user input may be one or more mouse clicks at or near a portion of text. Alternatively, for example, when the media item is a media stream including audio data and/or video data, the user input may be one or more keyboard keystrokes.

In response to receiving the user input, the processor 208 can obtain or capture the portion of the media item identified by the user input. The portion of the media item can also depend on the type of media item being output. For example, when the media item includes only text, the user input can cause the processor 208 to capture the portion of text within a predefined distance or area from the one or more mouse clicks. Alternatively, for example, when the media item is a media stream including audio data and/or video data, the user input can cause the processor 208 to capture the portion of the media stream (its audio data and/or video data) for a predetermined period prior to when the user input was received. Other suitable rules specifying how to capture the portion of the media item can also be implemented.

As previously mentioned, when the media item is a media stream including at least one of audio data and video data, the processor 208 can also determine a text corresponding to the audio data and/or video data for the portion of the media item. For example, the processor 208 can perform voice/speech recognition to determine the text from the audio data for the portion of the media item. Any suitable voice/speech recognition techniques can be used. Additionally, in some cases the video data can include subtitles for corresponding audio data. In these cases, the processor 208 may also determine the text from the subtitles in the video data. For example only, the processor 208 can perform optical character recognition to determine the text from the subtitles in the video data. Other suitable image-to-text conversion techniques can also be used.

Additionally, after the communication device 204 has received the translated text from the translation server 116, the processor 208 can control the manner in which the translated text is presented to the user 108 via the user interface 200. Specifically, when the media item is a media stream, the processor 208 can capture the portion of the media item and receive the translated text from the translation server 116 before the outputting of the media stream has completed. In these cases, the processor 208 can wait until the media stream has completed before outputting the translated text via the user interface 200. Alternatively, the processor 208 can output the translated text immediately upon receipt from the translation server 116 or a predetermined period after receipt. Further, the processor 208 can control additional information that is presented to the user 108 via the user interface 200, such as the text for the portion of the media item (pre-translation), a definition, related words/phrases, hyperlinks to Internet-based language resources, and the like.

Figure 3:
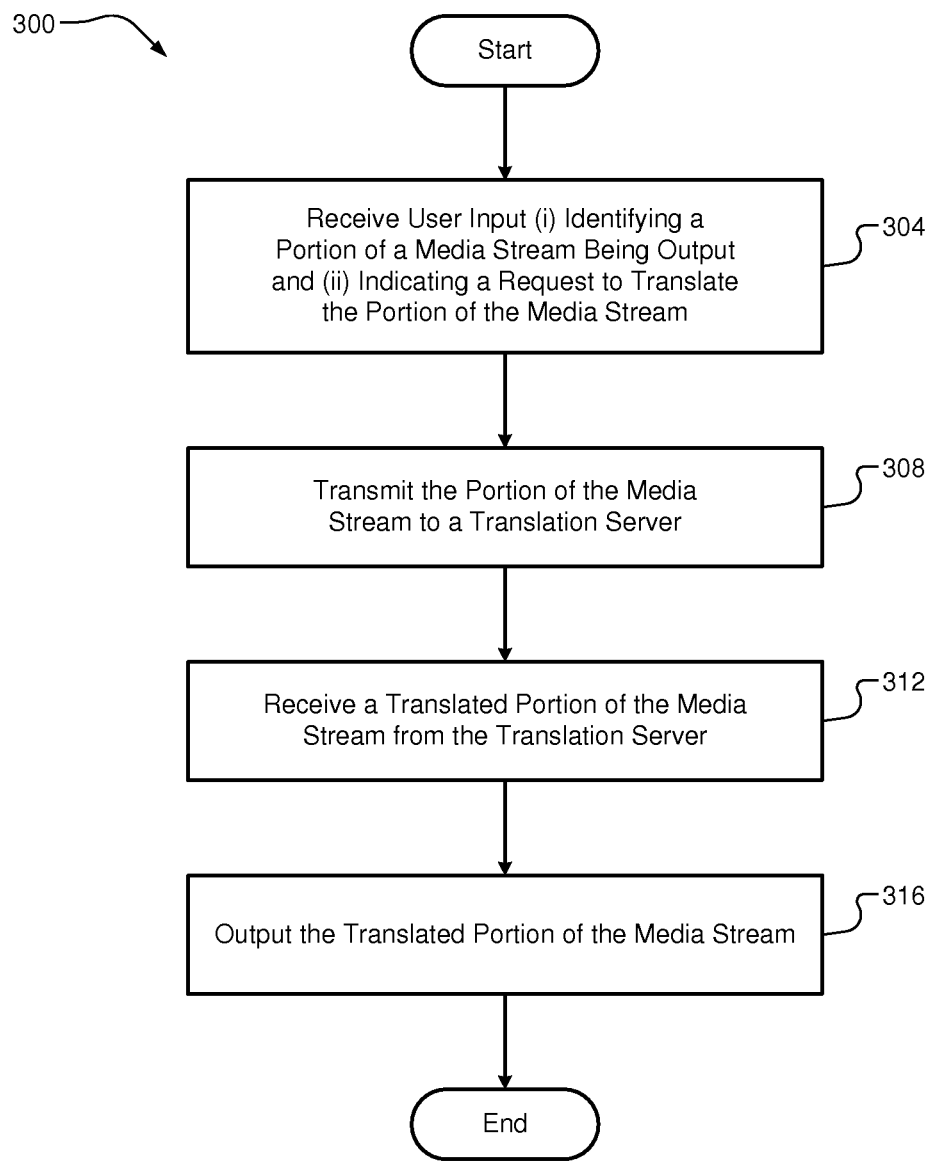
FIG. 3 is a flow diagram of an example technique for user identification of and translation of media according to some techniques of the present disclosure.

Referring now to FIG. 3, a flow diagram of an example technique 300 for user identification of and translation of media is illustrated. At 304, the computing device 104 can receive a user input (i) identifying a portion of a media stream being output at the computing device 104 and (ii) indicating a request to translate the portion of the media stream from a source language to a target language. At 308, the computing device 104 can transmit the portion of the media stream to the translation server 116 via the network 112 in response to receiving the user input. Specifically, the computing device 104 can transmit a text corresponding to the portion of the media stream to the translation server 116 via the network 112. In some implementations, the computing device 104 can determine the text based on the techniques previously discussed herein (optical character recognition, voice/speech recognition, etc).

At 312, the computing device 104 can receive a translated portion of the media stream from the translation server 116 via the network 112, the translated portion of the media stream having been translated from the source language to the target language by the translation server 116. Specifically, the computing device 104 can receive a translated text from the translation server 116 via the network 112, the translated text having been translated from the source language to the target language by the translation server 116. At 316, the computing device 104 can output the translated text.

In some implementations, the computing device 104 may wait until the media stream has completed before outputting the translated text. The computing device 104 can also output additional information as previously discussed herein. The technique 300 can then end or return to 304 for one or more additional cycles.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
   outputting, at a computing device including one or more processors, a media stream that includes at least one of audio data and video data, the media stream being fully defined between a start time and an end time;
   during the outputting of the media stream:
      (i) receiving, at the computing device, a user input (a) identifying a temporal point within the media stream and (b) indicating a request for translating a portion of the media stream from a source language to a target language,
      (ii) in response to receiving the user input, determining, at the computing device, a text by performing one of (a) speech recognition on a sub-period of the audio data as specified by the identified temporal point within the media stream and (b) optical character recognition on an image from the video data as specified by the identified temporal point, and
      (iii) transmitting, from the computing device, the text to a translation server via a network;
   receiving, at the computing device, a translated text from the translation server via the network, the translated text having been translated from the source language to the target language by the translation server; and
   in response to completion of the media stream, displaying, at a display of the computing device, the translated text at the end time of the media stream.

2. The computer-implemented method of claim 1, wherein the identified audio data sub-period is a predetermined period of the audio data prior to the temporal point until the temporal point.

3. The computer-implemented method of claim 2, wherein the user input includes one or more keystrokes of a keyboard.

4. The computer-implemented method of claim 1, wherein the user input identifies a sub-portion of the image, and wherein the optical character recognition is performed on the sub-portion of the image to obtain the text.

5. The computer-implemented method of claim 4, wherein the sub-portion of the image corresponds to a sub-title, and wherein the sub-title corresponds to a portion of the audio data.

6. A computer-implemented method, comprising:
   receiving, at a computing device including one or more processors, a first user input (i) identifying a first temporal point within a media stream being output from the computing device, the media stream being fully defined between a start time and an end time, and (ii) indicating a first request for translation of a portion of the media stream from a source language to a target language;
   in response to receiving the first user input:
      identifying, at the computing device, a sub-period of audio data of the media stream as specified by the identified first temporal point, the identified audio data sub-period being a predetermined period of the audio data prior to and until the first temporal point,
      performing, at the computing device, speech recognition on the identified audio data sub-period to obtain a first text, and
      transmitting, from the computing device, the first text to a translation server via a network;
   receiving, at the computing device via the network, a first translated text representing a translation of the first text from the source language to the target language by the translation server; and
   in response to completion of the media stream, displaying, at a display of the computing device, the first translated text at the end time of the media stream.

7. The computer-implemented method of claim 6, further comprising:
   receiving, at the computing device, a second user input identifying a second temporal point within the media stream and (ii) indicating a second request for language translation from the source language to the target language; and
   in response to receiving the second user input:
      identifying, at the computing device, an image from video data of the media stream as specified by the identified second temporal point,
      performing, at the computing device, optical character recognition on the identified image to obtain a second text, and
      transmitting, from the computing device and to the translation server via the network, the second text;
   receiving, at the computing device via the network, a second translated text representing a translation of the second text from the source language to the target language by the translation server; and
   outputting, at the computing device, the second translated text.

8. The computer-implemented method of claim 7, wherein the second input is a mouse-click or a touch input at or proximate to a sub-portion of the image.

9. The computer-implemented method of claim 8, wherein the sub-portion of the image corresponds to a sub-title, and wherein the sub-title corresponds to a portion of the audio data.

10. The computer-implemented method of claim 7, wherein identifying the sub-period of audio data, performing speech recognition on the identified audio data sub-period, identifying the image, performing optical character recognition on the identified image, transmitting the first and second texts to the translation server, and receiving the first and second translated texts from the translation server are each performed during outputting of the media stream.

11. The computer-implemented method of claim 10, wherein the first and second inputs are each received without interrupting the outputting of the media stream.

12. The computer-implemented method of claim 6, wherein the first user input includes one or more keystrokes of a keyboard.

13. The computer-implemented method 6, wherein identifying the sub-period of audio data, performing speech recognition on the identified audio data sub-period, transmitting the first text to the translation server, and receiving the first translated text from the translation server are each performed during outputting of the media stream.

14. The computer-implemented method of claim 13, wherein the first input is received without interrupting the outputting of the media stream.

15. A computing device, comprising:
a user interface configured to receive a first user input (i) identifying a first temporal point within a media stream being output from the computing device, the media stream being fully defined between a start time and an end time, and (ii) indicating a first request for translation of a portion of the media stream from a source language to a target language;
one or more processors configured to, in response to receiving the first user input:
identify an image from video data of the media stream as specified by the identified first temporal point, and
perform optical character recognition on the identified image to obtain a first text; and
a communication device configured to:
transmit the first text to a translation server via a network in response to receiving the first user input, and
receive a first translated text from the translation server via the network, the first translated text representing a translation of the first text from the source language to the target language by the translation server,
wherein a display of the user interface is further configured to, in response to completion of the media stream, display the first translated text at the end time of the media stream.

16. The computing device of claim 15, wherein:
the user interface is further configured to receive a second user input (i) identifying a second temporal point within the media stream and (ii) indicating a second request for language translation from the source language to the target language;
the one or more processors are further configured to, in response to receiving the second user input:
identifying a sub-period of audio data of the media stream as specified by the identified second temporal point, and
performing speech recognition on the identified audio data sub-period to obtain a second text;
the communication device is further configured to:
transmit, to the translation server via the network, the second text also in response to receiving the second user input; and
receive, via the network, a second translated text representing a translation of the second text from the source language to the target language by the translation server; and
the user interface is further configured to output the second translated text.

17. The computing device of claim 16, wherein the identified audio data sub-period is a predetermined period of the audio data prior to and until the second temporal point.

18. The computing device of claim 16, wherein the second user input includes one or more keystrokes of a keyboard.

19. The computing device of claim 15, wherein the first user input is a mouse-click or touch input at or proximate to a sub-portion of the image.

20. The computing device of claim 19, wherein the sub-portion of the image corresponds to a sub-title, and wherein the sub-title corresponds to a portion of audio data of the media stream.

\* \* \* \* \*